United States Patent [19]
Schulten et al.

[11] Patent Number: 6,130,495
[45] Date of Patent: Oct. 10, 2000

[54] SUPPORTING ELEMENT FOR AN ELECTRIC WINDING, TURBOGENERATOR AND METHOD OF PRODUCING A CORONA SHIELD

[75] Inventors: Michael Schulten, Bochum; Ingo Thiemann, Bottrop, both of Germany

[73] Assignee: Siemens Aktiengesellschaft, Munich, Germany

[21] Appl. No.: 09/192,751

[22] Filed: Nov. 16, 1998

Related U.S. Application Data

[63] Continuation of application No. PCT/DE97/00973, May 14, 1997.

[30] Foreign Application Priority Data

May 15, 1996 [DE] Germany .............. 196 19 724

[51] Int. Cl.⁷ .................................................. H02K 3/40
[52] U.S. Cl. .......................... 310/196; 310/45; 174/127; 174/120 SC
[58] Field of Search ................ 310/196, 45; 174/127, 174/120 SC, 120 R

[56] References Cited

U.S. PATENT DOCUMENTS

| | | | |
|---|---|---|---|
| 2,427,749 | 9/1947 | Schulman | 310/45 |
| 2,939,976 | 6/1960 | Manni | 310/196 |
| 3,474,527 | 10/1969 | Meyer | 29/596 |
| 3,679,925 | 7/1972 | Fort | 310/196 |
| 3,990,029 | 11/1976 | Kano et al. | 335/297 |
| 4,001,616 | 1/1977 | Lonseth et al. | 310/45 |
| 4,008,409 | 2/1977 | Rhudy et al. | 310/45 |
| 4,427,740 | 1/1984 | Stackhouse et al. | 310/45 |
| 4,853,565 | 8/1989 | Elton et al. | 310/45 |

FOREIGN PATENT DOCUMENTS

| | | |
|---|---|---|
| 0 481 984 B1 | 4/1992 | European Pat. Off. . |
| 36 36 008 A1 | 6/1987 | Germany . |
| 42 19 064 A1 | 12/1993 | Germany . |
| 714 311 | 8/1954 | United Kingdom . |

OTHER PUBLICATIONS

Patent Abstracts of Japan No. 56–150939 (Kenichi), dated Nov. 21, 1981.
Patent Abstracts of Japan No. 59–117435 (Matsutaro), dated Jul. 6, 1984.
Patent Abstracts of Japan No. 59–122332 (Koji), dated Jul. 14, 1984.

*Primary Examiner*—Clayton LaBelle
*Assistant Examiner*—Burton Mullins
*Attorney, Agent, or Firm*—Herbert L. Lerner; Laurence A. Greenberg; Werner H. Stemer

[57] ABSTRACT

A supporting element or core stack for an electric winding, in particular for a stator of a turbogenerator, includes a supporting surface to which an electric conductor can be attached. The supporting surface is provided with a coating for corona shielding. A turbogenerator has the supporting element. A method of producing a corona shield for an electric winding disposed on a supporting element, includes providing the supporting element with a coating for corona shielding.

14 Claims, 3 Drawing Sheets

SUPPORTING ELEMENT FOR AN ELECTRIC WINDING, TURBOGENERATOR AND METHOD OF PRODUCING A CORONA SHIELD

CROSS-REFERENCE TO RELATED APPLICATION

This application is a continuation of copending International Application No. PCT/DE97/00973 filed May 14, 1997, which designated the United States.

BACKGROUND OF THE INVENTION

FIELD OF THE INVENTION

The invention relates to a supporting element for an electric winding, a turbogenerator.

A conductor winding configuration for a large electrical machine, in particular for a turbogenerator, is disclosed by European Patent 0 481 984 B1. The conductor winding configuration is constructed in such a way that slots, in which electric conductors are disposed in each case, are provided in a supporting element. The electric conductors are in each case insulated and fastened in the slot by suitable measures. The conductor winding configuration is surrounded by a curable filler, such as a synthetic resin for example, in a total-immersion impregnating process. The initially liquid filler is cured at a temperature between about 100 and 200° C. After curing has been carried out, the conductor winding configuration, which has then combined to form a compact solid, cools to room temperature. In the process, thermally induced shrinkage occurs. That leads to tensile stresses within the configuration. It is thus possible for cracks to form. Corona discharges, which in particular can also lead to damage to the conductor insulation over the course of time, are able to occur at such cracks. According to EP 0 481 984 B1, such crack formation is to be concentrated in a controlled manner in a region in which only harmlessly low electric field strengths are intended to occur. To that end, a semiconducting tape is wound onto the insulation of the electric conductor, forming a first semiconductor layer. A second semiconductor layer is wound over the first semiconductor layer, and is connected electrically to the first semiconductor layer. A separating layer, which is permeable to the filler, is disposed between the two semiconductor layers. That separating layer, which preferably contains a mica flake tape, represents an intended rupture point, so that thermally induced stresses essentially lead to crack formation only at the separating layer. Such a procedure therefore results in a concentrated, controlled crack formation in the region of the separating layer. The separating layer lies in a region of low or vanishing electric field strength, since it is disposed between the two semiconductor layers, which are connected electrically to each other. The two semiconductor layers are at virtually the same potential, as a result of which the region between the two semiconductor layers becomes virtually potential-free and therefore virtually field-free. Damaging corona discharges thus do not occur at the cracks concentrated in the region of the separating layer.

German Published, Non-Prosecuted Patent Application DE 42 19 064 A1 describes a corona shield configuration for a stator winding of an electrical machine. In the illustrated stator winding, an electric conductor which is surrounded by a main insulation is disposed in a slot of a core stack. The slot has a slot wall. The main insulation is surrounded by a first corona shielding layer made of a semiconductive material. A second corona shielding layer is applied to that first corona shield layer. The second corona shielding layer rests on the slot wall. It is treated in such a way that it repels an impregnating resin, in which the stator winding is totally immersed. Therefore, the second corona shielding layer adheres neither to the first corona shielding layer nor to the slot wall. Thermally induced expansions between the electric conductor and the core stack are thus possible to a large extent without mechanical stresses. The formation of cracks, at which corona discharges can occur, is thus largely suppressed.

SUMMARY OF THE INVENTION

It is accordingly an object of the invention to provide a supporting element for an electric winding, a turbogenerator, which overcome the hereinafore-mentioned disadvantages of the heretofore-known devices of this general type.

With the foregoing and other objects in view there is provided, in accordance with the invention, a supporting element, comprising a supporting surface for attachment of an electric conductor of an electric winding, the electric winding to be surrounded by an impregnating substance; and a corona shielding coating at least partly disposed on the supporting surface.

Such a supporting element permits an electric winding to be built up in a simple manner in such a way that effective corona shielding results. The particular advantage of a coating of the supporting surface of the supporting element resides in the fact that the production of the electric conductor for installation on or incorporation in the supporting element is considerably simplified. All that generally remains necessary is to insulate the electric conductor and to provide the insulation with a single corona shielding layer, for example a semiconductive tape. Additional measures for avoiding the formation of cracks or for controlled crack formation are rendered superfluous for the production of the electric conductor. This results in a distinct time and cost saving.

In accordance with another feature of the invention, the coating is composed in such a way that an at most slight mutual adhesion of the coating and the impregnating substance can be achieved. As a result, the formation of cracks, which could result from mechanical stresses, is reduced. Such mechanical stresses are brought about in particular by different thermal expansions of the electric conductor and the supporting element. Improved corona shielding is achieved by the fact that, given an impregnation with the impregnating substance, only slight adhesion between the supporting element and the electric conductor results from the coating. Mechanical stresses, which could be brought about by a different thermal expansion of the supporting element and the electric conductor as a result of firm bonding between the supporting element and the electric conductor, are suppressed in this way. Therefore, no cracks or only a few cracks, through which a corona discharge could occur, are formed.

In accordance with a further feature of the invention, the coating is electrically weakly conductive. This supports corona shielding through the use of the fact that local charge accumulations and therefore local high electric fields do not occur. The weak conductivity ensures that no appreciable eddy currents are induced.

In accordance with an added feature of the invention, the coating can be deformed elastically in such a way that an interspace which can be produced between the supporting surface and the electric conductor, in particular as a result of different thermal expansion of the electric conductor and of the supporting element, can be filled by the coating. The elastic deformation ensures that, in the event of a thermally induced shrinkage of the electric conductor and/or of the supporting element, no gap forms through which a corona discharge could occur. As a result of the elastically deformable coating, shrinkage is compensated due to the coating increasing its thickness, so that no gap forms.

In accordance with an additional feature of the invention, the coating contains silicone.

In accordance with yet another feature of the invention, the coating is a silicone rubber or a silicone varnish, in particular a room-temperature cross-linking silicone rubber or silicone varnish. Silicone varnish or silicone rubber is a particularly suitable material for the coating. However, the coating may also contain further substances, preferably an additive effecting semiconductivity.

In accordance with yet a further feature of the invention, the coating is between 10 μm and 1 mm thick.

In accordance with yet an added feature of the invention, the supporting element is constructed as a core stack for a stator winding of a generator, in particular for a turbogenerator with a power greater than 10 MVA.

In accordance with yet an additional feature of the invention, the supporting element is installed in a turbogenerator, in particular in a turbogenerator with a power greater than 10 MVA, the turbogenerator has a stator winding with a stator current conductor, the electric winding is the stator winding and the electric conductor is the stator current conductor.

In accordance with again another feature of the invention, the supporting element has a surface in which a slot with a slot wall is provided, and the supporting surface is formed by the slot wall.

In accordance with again a further feature of the invention, the supporting element has a covering strip for closing the slot, and the covering strip has an inner surface which is directed towards the slot and is at least partly provided with the coating. As a rule, an electric conductor is laid into the slot of the supporting element and secured by the covering strip, which suppresses a displacement of the conductor in the radial direction. Mechanical stresses, which can be brought about by a thermally induced displacement between the electric conductor and the covering strip, can be suppressed by providing the inner surface of the covering strip with the coating.

In accordance with again an added feature of the invention, the supporting element has a separator having a separator surface dividing the slot in its height into two parts, and the separator surface is at least partly provided with the coating. In the case of a turbogenerator, provision can be made for two electric conductors to be disposed one above the other in a slot. In this case, firstly the lower conductor is installed and secured by the separator against radial displacement. The second electric conductor is installed above the separator. Mechanical stresses, which can be brought about by a thermally induced displacement between the electric conductor and the separator, can be suppressed by the separator surface or part of the separator surface being provided with the coating.

With the objects of the invention in view there is also provided a method of producing a corona shield for an electric winding, which comprises providing a supporting element with a supporting surface having a coating region; placing an electric conductor on the supporting surface; at least partly surrounding the supporting element and the electric conductor with an impregnating substance, in particular a synthetic resin; and covering the coating region with a coating to which the impregnating substance at most slightly adheres.

The advantages of a corona shield produced in this way are obtained in a manner corresponding to the statements made above.

In accordance with another mode of the invention, the coating is constructed to be electrically weakly conductive.

In accordance with a concomitant mode of the invention, the coating is constructed as a silicone rubber or as a silicone varnish, in particular as a room-temperature cross-linking silicone rubber or silicone varnish.

Other features which are considered as characteristic for the invention are set forth in the appended claims.

Although the invention is illustrated and described herein as embodied in a supporting element for an electric winding, a turbogenerator and a method of producing a corona shield, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
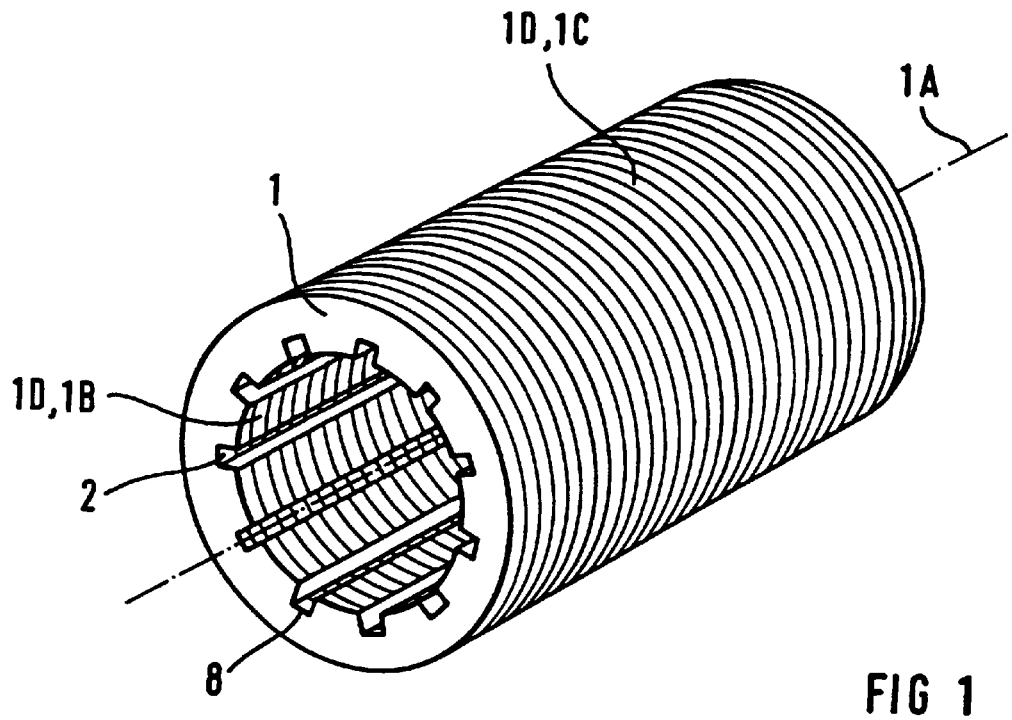
FIG. 1 is a diagrammatic, perspective view of a supporting element.

Referring now in detail to the figures of the drawings, in which identical reference symbols have the same meaning, and first, particularly, to FIG. 1 thereof, there is seen a diagrammatically illustrated supporting element 1, which is constructed as a core stack 1 for a stator winding of a turbogenerator. The core stack 1 represents a hollow cylinder that is directed along an axis 1A and has an inner surface 1B and an outer surface 1C. The inner surface 1B and the outer surface 1C are part of a supporting element surface 1D. A plurality of mutually identically spaced slots 8 on the inner surface 1B have a respective rectangular cross-section and extend along the axis 1A, over the entire length of the supporting element 1.

Figure 3:
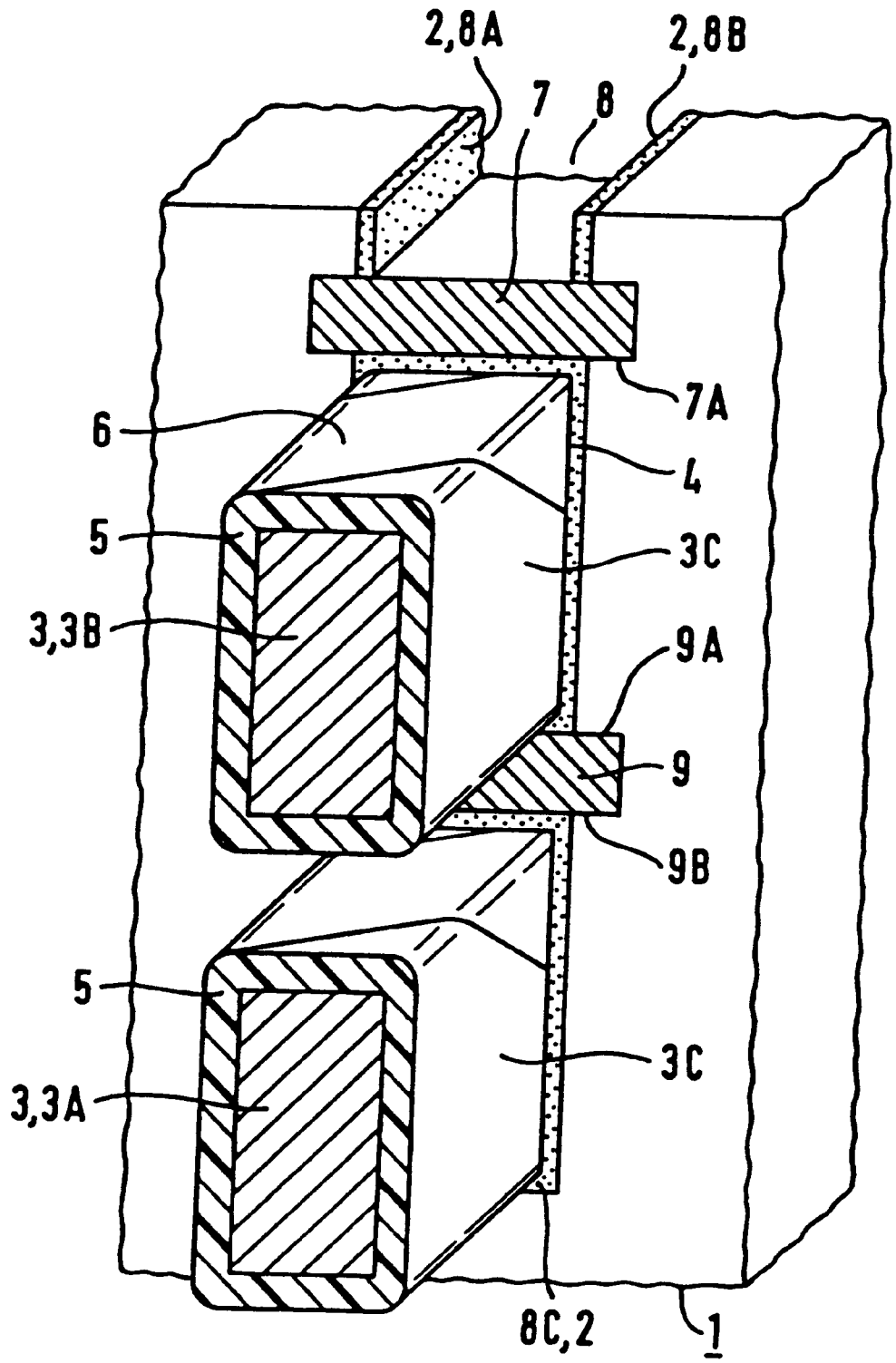
FIG. 3 is a fragmentary, perspective view of a slot of a supporting element with installed electric conductors.

If such a supporting element 1 is used in a non-illustrated turbogenerator, an electric conductor 3 or two electric conductors 3A, 3B of an electric winding 3C disposed one above the other are laid into each slot 8, as is shown in FIG. 3. The electric conductors 3 are connected to one another to form a non-illustrated electric winding. Further details are explained with reference to FIG. 3. The non-illustrated finished electric winding, together with the supporting element 1, is surrounded with an impregnating substance in a total immersion impregnation process. The impregnating substance is cured. Following the curing of the impregnating substance, the result is a compact, coherent solid.

Figure 2:
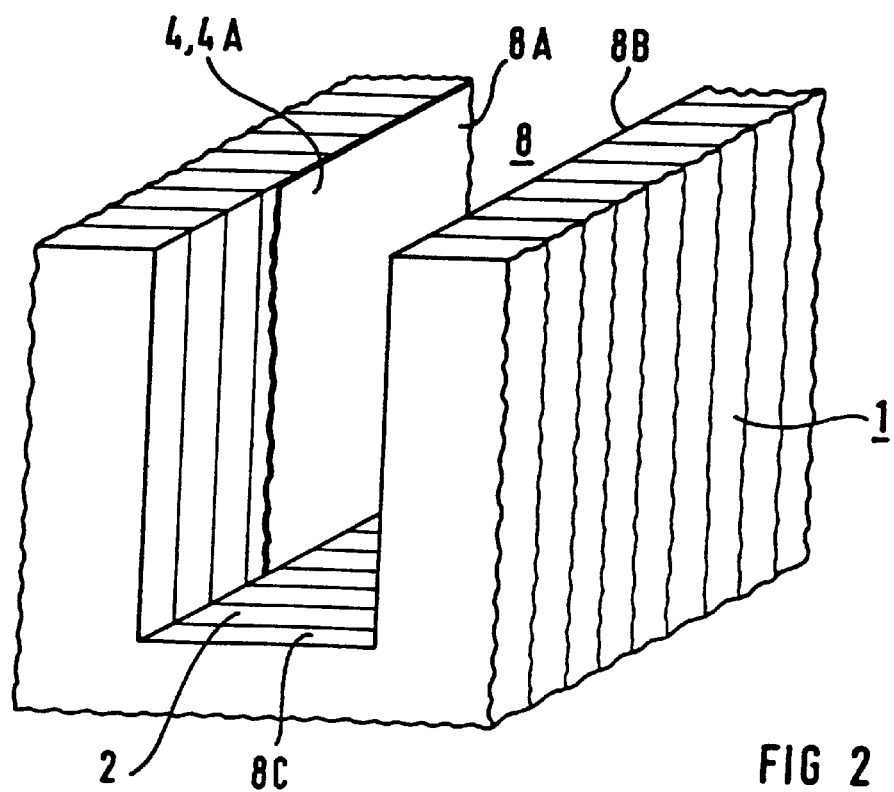
FIG. 2 is an enlarged, fragmentary, perspective view of a portion of the supporting element of FIG. 1.

FIG. 2 shows a portion of the supporting element 1 of FIG. 1, having a slot 8. The slot 8 has slot walls 8A, 8B and 8C. These slot walls BA, 8B, 8C are part of a supporting surface 2. A coating 4 is applied to the slot wall 8A in a coating region 4A. This coating 4 is weakly electrically conductive and can be deformed elastically in a direction normal to the surface 8A.

FIG. 3 shows a portion of the supporting element 1 of FIG. 2, having the two electric conductors 3A, 3B disposed one above the other in the slot 8. Each electric conductor 3A, 3B is surrounded by a respective insulation 5. A weakly conductive corona shielding tape 6 is wound onto each insulation 5. The lower conductor 3A is secured against radial displacement upwards by a separator 9 having a separator surface 9A, 9B. The upper conductor 3B adjoins the separator 9. This conductor 3B is in turn secured against radial displacement upwards through the use of a covering strip 7 having an inner surface 7A. In this embodiment the supporting surface 2 is formed by the inner surface 7A of the covering strip 7, the separator surface 9A, 9B of the separator 9 and the slot walls 8A, 8B and 8C. In this example, all of these surfaces are provided with a coating 4. However, it is also possible for only some of these surfaces or parts of these surfaces to be provided with a coating 4, while the other surfaces or the other parts of these surfaces remain uncoated. During total-immersion impregnation of an electric winding produced in this way, the impregnating substance adheres at most slightly to the coating 4. Therefore, crack formation does not occur as a result of mechanical stresses, which can be brought about by thermally induced expansions of the electric conductor 3 on one hand, and of the supporting element 1 on the other hand. An effective corona shield is thus provided, since corona discharges through cracks do not occur.

Figure 4:
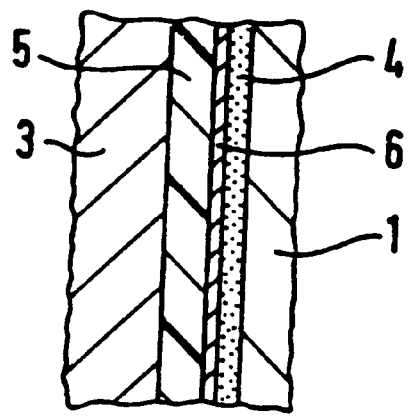
FIG. 4 is a fragmentary, cross-sectional view of an electric conductor adjoining a slot wall.
Figure 5:
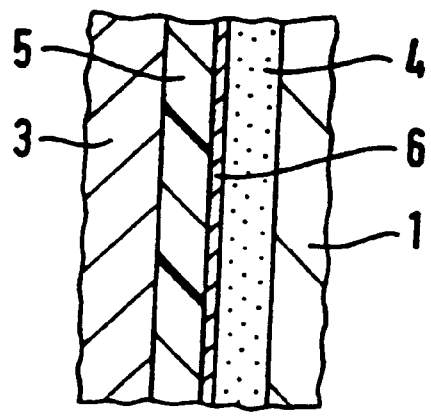
FIG. 5 is a view of the electric conductor adjoining a slot wall according to FIG. 4, after thermal shrinkage.

FIG. 4 shows a contact area between the electric conductor 3 and the supporting element 1 in a fragmentary cross-section at right angles to the electric conductor 3. In a heated state, in particular during curing of the impregnating substance, the coating 4 is compressed between the outer corona shield 6 of the electric conductor 3 surrounded by the insulation 5 and the slot wall 8B of the slot 8 in the supporting element 1. After curing of the impregnating substance has been carried out, cooling occurs, and therefore thermally induced shrinkage both of the electric conductor 3 as well as of the supporting element 1. This state is illustrated in FIG. 5. This results in a relatively large distance between the electric conductor 3 and the supporting element 1, as compared with the heated state in FIG. 4. Such a relatively large distance leads to an enlarged interspace between the electric conductor 3 and the supporting element 1. This space is filled by the coating 4, since the latter can be deformed elastically. This can be seen from the increased thickness of the coating 4 in comparison with FIG. 4. Therefore, no gap through which gap corona discharges could occur is produced between the electric conductor 3 and supporting element 1.

We claim:

1. A supporting element, comprising:
    a supporting surface for attachment of an electric conductor of an electric winding, said electric winding to be surrounded by an impregnating substance; and
    a corona shielding coating at least partly coated onto said supporting surface, said coating being integrally formed on said supporting surface and having a composition achieving at most a slight mutual adhesion between said coating and said impregnating substance.

2. The supporting element according to claim 1, wherein said coating is electrically weakly conductive.

3. The supporting element according to claim 1, wherein said coating contains silicone.

4. The supporting element according to claim 3, wherein said coating is selected from the group consisting of a silicone rubber and a silicone varnish.

5. The supporting element according to claim 3, wherein said coating is selected from the group consisting of a room-temperature cross-linking silicone rubber or silicone varnish.

6. The supporting element according to claim 1, wherein said coating is between 10 $\mu$m and 1 mm thick.

7. The supporting element according to claim 1, including a surface having a slot formed therein, said slot having a slot wall forming said supporting surface.

8. The supporting element according to claim 7, including a covering strip closing said slot and having an inner surface directed towards said slot, said coating disposed at least partly on said inner surface.

9. The supporting element according to claim 7, including a separator having a separator surface dividing said slot into two parts, said coating disposed at least partly on said separator surface.

10. A turbogenerator, comprising a supporting element according to claim 1, wherein the electric winding is a stator winding and the electric conductor is a stator current conductor.

11. A turbogenerator having a power greater than 10 MVA, comprising a supporting element according to claim 1, wherein the electric winding is a stator winding and the electric conductor is a stator current conductor.

12. The supporting element, comprising:
    a supporting surface for attachment of an electric conductor of an electric winding to be surrounded by an impregnating substance; and
    a corona shielding coating at least partly coated onto said supporting surface and rigidly adhering to said supporting surface, said coating being elastically deformable for filling an interspace produced between said supporting surface and the electric conductor by thermal expansion.

13. A core stack for a stator winding of a generator, comprising:
    a supporting surface for attachment of an electric conductor of an electric winding, the electric winding to be surrounded by an impregnating substance; and
    a corona shielding coating at least partly coated onto said supporting surface, said coating being integrally formed an said supporting surface and having a composition achieving at most a slight mutual adhesion between said coating and said impregnation substance.

14. The core stack according to claim 13, wherein the turbogenerator has a power greater than 10 MVA.

* * * * *